United States Patent Office 3,539,694
Patented Nov. 10, 1970

3,539,694
PROCESS FOR THE MANUFACTURE
OF CEPHALOSPORIN C
Hamilton F. Niss, Indianapolis, Ind., assignor to Eli Lilly
and Company, Indianapolis, Ind., a corporation of
Indiana
No Drawing. Filed June 23, 1967, Ser. No. 648,232
Int. Cl. C12d 9/22
U.S. Cl. 13—31                                    1 Claim

ABSTRACT OF THE DISCLOSURE

Improvement in the process for fermentation of cephalosporin C wherein calcium sulfate is added to the culture medium.

BACKGROUND OF THE INVENTION

This invention pertains to an improvement in the process for the manufacture of cephalosporin C.

It has been believed that methionine, and more particularly D-methionine, is unique in its stimulation of the synthesis of cephalosporin C by the organism *Cephalosporium acremonium*, Kavanagh et al., Biochem. Biophys., 77, 268–274 (1958), Demain and Newkirk, Appl. Microbiol., 10, 321–325 (1962), Ott et al., Appl. Microbiol., 10, 515–523 (1962), U.S. Pat. 3,082,155, U.S. Pat. 3,139,389, and Great Britain Pat. No. 759,624. Experiments with methionine-$S^{35}$ have shown that essentially all the sulfur in cephalosporin C is derived from the added methionine. Additionally, sulfur-labeld compounds have been found in the antibiotic-containing broth. These compounds include homocysteine, taurine, cystathionine, cysteic acid, glutathionine, and cysteine. The following compounds have been shown to contribute no sulfur and no improved antibiotic yield over a control containing the usual nutrient materials: S-methyl-L-cysteine, L-cysteine, taurine, homocysteine, S-ethyl-L-cysteine, L-cysteic acid, allo-cystathionine, norleucine, and norvaline.

It is believed that the amino-acid sequence aminoadipylcysteinyl-valine comprises the basic structure of cephalosporin C and cephalosporin N, and that methionine donates its sulfur to this sequence through the intermediate formation of cysteine, as for example:

produces cephalosporin C in substantially equivalent yields and of superior quality to that produced by adding an equivalent percentage of methionine to the culture broth. The addition of calcium sulfate instead of methionine simplifies the isolation and purification of the cephalosporin C produced, and provides a more economical nutrient medium. The addition of calcium sulfate also increases the ratio of the desired cephalosporin C to the unwanted cephalosporin N in the product.

The addition of methionine to the nutrient medium yields an antibiotic broth containing about 20 percent cephalosporin N and about 80 percent cephalosporin C, whereas the addition of calcium sulfate yields an antibiotic broth containing only about 10 percent cephalosporin N and 90 percent cephalosporin C. Such an increase in the purity of the cephalosporin C broth has an additional benefit, in that simplified procedures for purification and isolation of the desired antibiotic can be used.

Nutrients useful for the growth of cephalosporins include corn steep liquor, peanut meal, cottonseed protein, meat protein, dried blood, α-protein, collagen gluten, egg albumin, lactose, glycerine, starch, sorbitol, maltose, sucrose, galactose, cerelose, lard oil, methyl oleate, triolein, tripalmitin, cottonseed oil, corn oil, raw soybean oil, linseed oil, and cod liver oil.

Cephalosporin C is useful for the preparation of 7-aminocephalosporanic acid (7–ACA), e.g. by cleavage with nitrosylchloride as disclosed in U.S. Pat. 3,188,311 (June 8, 1965). The thus prepared 7–ACA can then be reacted in a known manner with an active derivative of an acid, as for example, α-thienylacetyl chloride, to manufacture synthetic cephalosporin compounds with superior antibiotic activity.

A typical fermentation utilizes a medium comprising corn steep liquor, fish meal, sucrose, and peanut meal in sufficient quantities to give about 1600 milligrams of nitrogen per liter of aqueous suspension, together with about 0.1 percent to about 1.0 percent of calcium carbonate, and about 0.1 percent to about 1.0 percent calcium sulfate. The medium is adjusted to a range of about pH 5 to about pH 7.3, preferably about pH 6.9, and is aerated at a rate of about 0.8 to about 1.2 volumes of air per volume of medium per minute, preferably about 1 v./v./m. The medium is inoculated in the usual manner with a con-

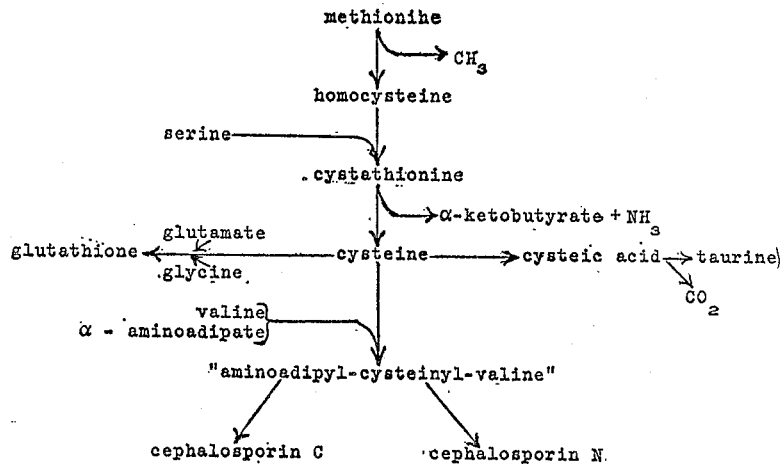

SUMMARY

We have found that during the culturing of cephalosporin C producing organism in a methionine-free aqueous medium containing one or more nutrient materals, the addition of calcium sulfate in a concentration of about 0.1 percent to about 1.0 percent of the nutrient medium ventional cephalosporin C producing organism, of which *Cephalosporium acremonium* sp. A.T.C.C. 14553, and C.M.I. 49137 Mutant 8650, are examples. Fermentation is allowed to continue with constant agitation and aeration for about 96 to about 120 hours. The resulting crude fermentation mixture is purified in a conventional manner, e.g. by filtration, carbon clarification, adsorption on an ion-exchange resin (H+ form), elution with an aqueous base, as for example pyridine, and evaporation to crystallinity.

The following example will more precisely define the invention:

Growth from a 1-inch slant of a standard production lot of a cephalosporin-producing species of *Cephalosporium acremonium* was suspended in 10 ml. of nutrient broth and was used to inoculate a seed medium. The seed medium consisted of 12.0 g. soy bean flour, 1.6 g. ammonium acetate, 2.4 g. calcium carbonate, 16.0 g. corn starch, and 8.0 g. methyl oleate in enough water to make 800 ml. of suspension in a 2-liter Erlenmeyer flask. The inoculated medium was incubated for 72 hours at 25° C. on a rotary shaker at 250 r.p.m.

Eighty-five milliliters of each of the following media were then inoculated from the resulting seed culture and incubated at 22° C. for 114 hours while being agitated on a rotary shaker at 250 r.p.m. The antibiotic was isolated and assayed against a *Salmonella gallinarum* challenge. Yields are expressed in micrograms of cephalosporin C per milliliter of solution at harvest.

MEDIUM A

| | Percent |
|---|---|
| Peanut meal | 4.0 |
| Soybean meal | 2.0 |
| Beet molasses | 3.45 |
| Methyl oleate | 0.575 |
| Lard oil | 6.0 |
| $Na_2SO_4$ | 0.4 |
| $CaCO_3$ | 0.2 |

Yield 3240 μg./ml.

MEDIUM B

| | |
|---|---|
| Peanut meal | 4.0 |
| Soybean meal | 2.0 |
| Beet molasses | 3.45 |
| Methyl oleate | 0.575 |
| Lard oil | 6.0 |
| $Na_2SO_4$ | 0.3 |
| $(NH_4)_2SO_4$ | 0.1 |
| $CaCO_3$ | 0.2 |

Yield 3560 μg./ml.

MEDIUM C

| | Percent |
|---|---|
| Peanut meal | 4.0 |
| Soybean meal | 2.0 |
| Beet molasses | 3.45 |
| Methyl oleate | 0.575 |
| Lard oil | 6.0 |
| Methionine | 0.4 |
| $CaCO_3$ | 0.2 |

Yield 4190 μg./ml.

MEDIUM D

| | |
|---|---|
| Peanut meal | 4.0 |
| Soybean meal | 2.0 |
| Beet molasses | 3.45 |
| Methyl oleate | 0.575 |
| Lard oil | 6.0 |
| $CaSO_4 \cdot 2H_2O$ | 0.4 |

Yield 3920 μg./ml.

While there has been described a specific embodiment of the invention, the methods and elements described are not to be understood as limiting the scope of the invention. Numerous modifications and equivalents of the invention will be readily apparent to those skilled in the art from the foregoing description, and it is to be understood that such variants lie within the scope of the invention.

I claim:

1. In the process for producing cephalosporin C by fermenting a nutrient medium free of added methionine containing available nitrogen, carbohydrate, and mineral with a cephalosporin C producing organism and recovering cephalosporin C from the medium, the improvement which comprises adding to the fermentation medium calcium sulfate in a sfficient quantity to supply sulfur utilized in the production of cephalosporin C.

References Cited

UNITED STATES PATENTS 3,139,388  6/1964  Platt et al. _____ 195—36

MAURICE W. GREENSTEIN, Primary Examiner

U.S. Cl. X.R.

195—81, 100, 102, 114